US007463989B2

(12) United States Patent
Butland et al.

(10) Patent No.: US 7,463,989 B2
(45) Date of Patent: Dec. 9, 2008

(54) WAVEFORM RECORDER APPARATUS AND METHOD

(75) Inventors: Geoff Butland, Farmington, CT (US); Michael S. Tignor, Watertown, CT (US); John J. Dougherty, Collegeville, PA (US); Craig Benjamin Williams, Avon, CT (US); Mark Culler, Prospect, KY (US)

(73) Assignee: General Electric Company, Schenectady, NY (US)

( * ) Notice: Subject to any disclaimer, the term of this patent is extended or adjusted under 35 U.S.C. 154(b) by 413 days.

(21) Appl. No.: 11/315,525

(22) Filed: Dec. 21, 2005

(65) Prior Publication Data

US 2007/0139846 A1 Jun. 21, 2007

(51) Int. Cl.
*G06F 15/00* (2006.01)
(52) U.S. Cl. .......................... 702/66; 702/57
(58) Field of Classification Search ................ 361/93.2; 702/57, 66; 324/424; 340/3.3, 3.32, 649, 340/658, 659; 700/292, 293
See application file for complete search history.

(56) References Cited

U.S. PATENT DOCUMENTS

| | | | | |
|---|---|---|---|---|
| 5,331,501 A * | 7/1994 | Shimp | ......................... | 361/94 |
| 5,706,203 A * | 1/1998 | Kawauchi | .................... | 702/66 |
| 6,175,780 B1 | 1/2001 | Engel | ........................ | 700/293 |
| 6,459,997 B1 | 10/2002 | Anderson | ..................... | 702/57 |
| 6,678,135 B2 * | 1/2004 | Tignor et al. | ............... | 361/93.3 |
| 6,731,487 B2 | 5/2004 | Fletcher | ..................... | 361/93.2 |
| 6,771,170 B2 * | 8/2004 | Papallo et al. | ............... | 340/531 |
| 6,847,297 B2 | 1/2005 | Lavoie | ....................... | 340/540 |
| 6,892,145 B2 * | 5/2005 | Topka et al. | .................. | 702/62 |
| 2002/0145517 A1 | 10/2002 | Papallo | ....................... | 340/531 |
| 2003/0179528 A1 | 9/2003 | Fletcher | ..................... | 361/93.2 |
| 2003/0184940 A1 | 10/2003 | Staver | ........................ | 361/93.6 |
| 2003/0212515 A1 | 11/2003 | Fletcher | ....................... | 702/60 |
| 2004/0019410 A1 | 1/2004 | Papallo | ........................ | 700/292 |
| 2004/0133370 A1 | 7/2004 | Lavoie | ........................ | 702/60 |
| 2004/0133814 A1 | 7/2004 | Lavoie | ........................ | 713/300 |
| 2005/0057870 A1 | 3/2005 | Stellato | ........................ | 361/66 |
| 2005/0273207 A1 | 12/2005 | Dougherty | ................... | 700/292 |

\* cited by examiner

*Primary Examiner*—Edward Cosimano
*Assistant Examiner*—Douglas N Washburn
(74) *Attorney, Agent, or Firm*—Cantor Colburn LLP

(57) ABSTRACT

A method for recording and having analyzed waveform data associated with an electronic circuit breaker having an electronic trip unit is disclosed. The electronic trip unit has a communication port and is capable of providing to the communication port a first signal representative of a phase current passing through the circuit breaker, and a second signal representative of a conditional event at the circuit breaker. The method includes facilitating the connection of a waveform recorder device to the communication port of the electronic trip unit; facilitating recording in a first memory of the waveform recorder device in a circular queue fashion information relating to the first signal received from the electronic trip unit; and, in response to the second signal received from the electronic trip unit, facilitating the stopping of the recording in the first memory.

17 Claims, 2 Drawing Sheets

WAVEFORM RECORDER APPARATUS AND METHOD

BACKGROUND OF THE INVENTION

The present disclosure relates generally to electronic circuit breakers, and particularly to a waveform recorder device for use with electronic circuit breakers.

Transient conditions on electrical distribution networks can cause hard to explain events. Electronic circuit breakers having electronic trip units with limited functionality may not include integral functions or options that provide monitoring functions capable of monitoring for these transient conditions. Accordingly, unusual events that occur within the electrical distribution network may go undiagnosed or even unnoticed. One solution to this problem is to rent line reading and recording equipment that is capable of monitoring, capturing and preserving transient conditions, then have specialized personnel install the equipment, and then have specialized personnel analyze the captured data. However, not only is this line recording equipment bulky, taking up valuable real estate in an installed application, difficult to attach to existing circuit breaker devices, or difficult to interface with existing electrical distribution networks, but the cost and inconvenience may be a deterrent that typically reserves the use of such equipment to only limited situations.

Accordingly, there is a need in the art for a low cost, compact, ease of use, waveform recorder device that may be quickly installed and interfaced with an electrical distribution network.

BRIEF DESCRIPTION OF THE INVENTION

An embodiment of the invention includes a method for recording and having analyzed waveform data associated with an electronic circuit breaker having an electronic trip unit, the electronic trip unit having a communication port and being capable of providing to the communication port a first signal representative of a phase current passing through the circuit breaker, and a second signal representative of a conditional event at the circuit breaker. The method includes facilitating the connection of a waveform recorder device to the communication port of the electronic trip unit; facilitating recording in a first memory of the waveform recorder device in a circular queue fashion information relating to the first signal received from the electronic trip unit; and, in response to the second signal received from the electronic trip unit, facilitating the stopping of the recording in the first memory.

Another embodiment of the invention includes a method for recording and having analyzed waveform data associated with an electronic circuit breaker. A set of data relating to a phase current at the circuit breaker is recorded at a waveform recorder device. Each recording of the set of data is temporally proximate a trip event at the circuit breaker, the waveform recorder device having been connected to the circuit breaker during the trip event. The set of data is extracted from the waveform recorder device to a data storage device for analysis at a location other than the waveform recorder device.

BRIEF DESCRIPTION OF THE DRAWINGS

Referring to the exemplary drawings wherein like elements are numbered alike in the accompanying Figures.

DETAILED DESCRIPTION OF THE INVENTION

An embodiment of the invention provides a waveform recorder device (WRD) configured to plug into an electronic trip unit (ETU) of an electronic circuit breaker for recording a time window of phase current information in response to a trip event at the circuit breaker. The WRD utilizes existing signals present at the ETU, and therefore requires no additional current transformers (CTs) of its own. Data from the WRD may be communicated to a local computer, communicated to a network computer, uploaded to an Internet service, or transported or mailed to a service center for analysis. While the embodiment described herein depicts a particular circuit breaker configuration, it will be appreciated that the disclosed invention is not so limited, and may be applied to any type of electronic circuit breaker. It is also contemplated that embodiments of the invention may be applicable to any electrical distribution device capable of generating a signal representative of phase current and another signal representative of a conditional event, such as a trip trigger.

Figure 1:
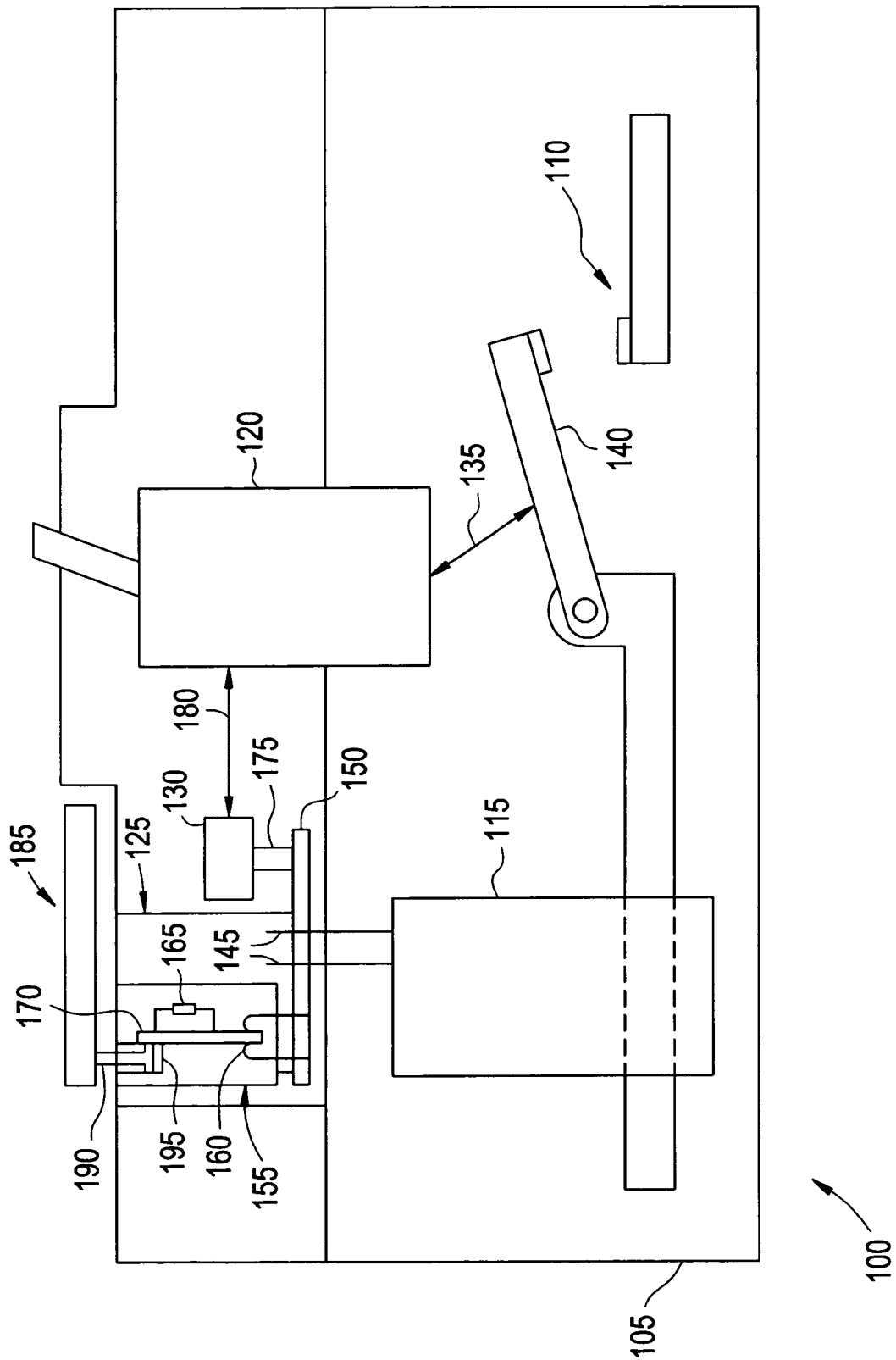
FIG. 1 depicts a side view of an exemplary electronic circuit breaker for use in accordance with an embodiment of the invention.

Referring to FIG. 1, an exemplary embodiment of an electronic circuit breaker 100 is depicted having a housing 105, a conduction path 110, a current transformer (CT) 115, an operating mechanism 120, an electronic trip unit (ETU) 125, and a trip actuator 130. The operating mechanism 120 serves to open and close the conduction path 110 via a linkage arrangement 135 and a contact arm arrangement 140. The CT 115 provides both power and a current signal via signal pins 145 to ETU 125, which includes a circuit board 150 in signal communication with the CT pins 145. A rating plug 155 is in signal communication with ETU 125 via connectors 160, and serves to configure the ampere rating of the circuit breaker 100 via burden resistors 165 on a second circuit board 170 contained therein. The ETU 125 via circuit board 150 monitors the level of current passing through the circuit breaker 100 and in response to an overcurrent current condition, provides a trip signal via pins 175 to trip actuator 130. In turn, trip actuator 130 via a mechanical logic path 180, causes the operating mechanism 120 to trip and open the contact arm arrangement 140. As a result of the configuration of circuit breaker 100, more specifically ETU 125 and rating plug 155, current signal information and trip signal information is available at the second circuit board 170 via the burden resistors 165.

FIG. 1 also depicts a waveform recorder device (WRD) 185 mounted to and in signal communication with the rating plug 155 via a connector 190 that is in signal communication with second circuit board 170. The rating plug 155 has a communication port 195 in which the connector 190 is plugged. Other mounting means (not shown) may be used to secure WRD 185 to rating plug 155, ETU 125, or circuit breaker housing 105, such as by using screws for example. In an embodiment, communication port 195 is an existing test kit jack already available in an installed base of circuit breakers 100.

Figure 2:
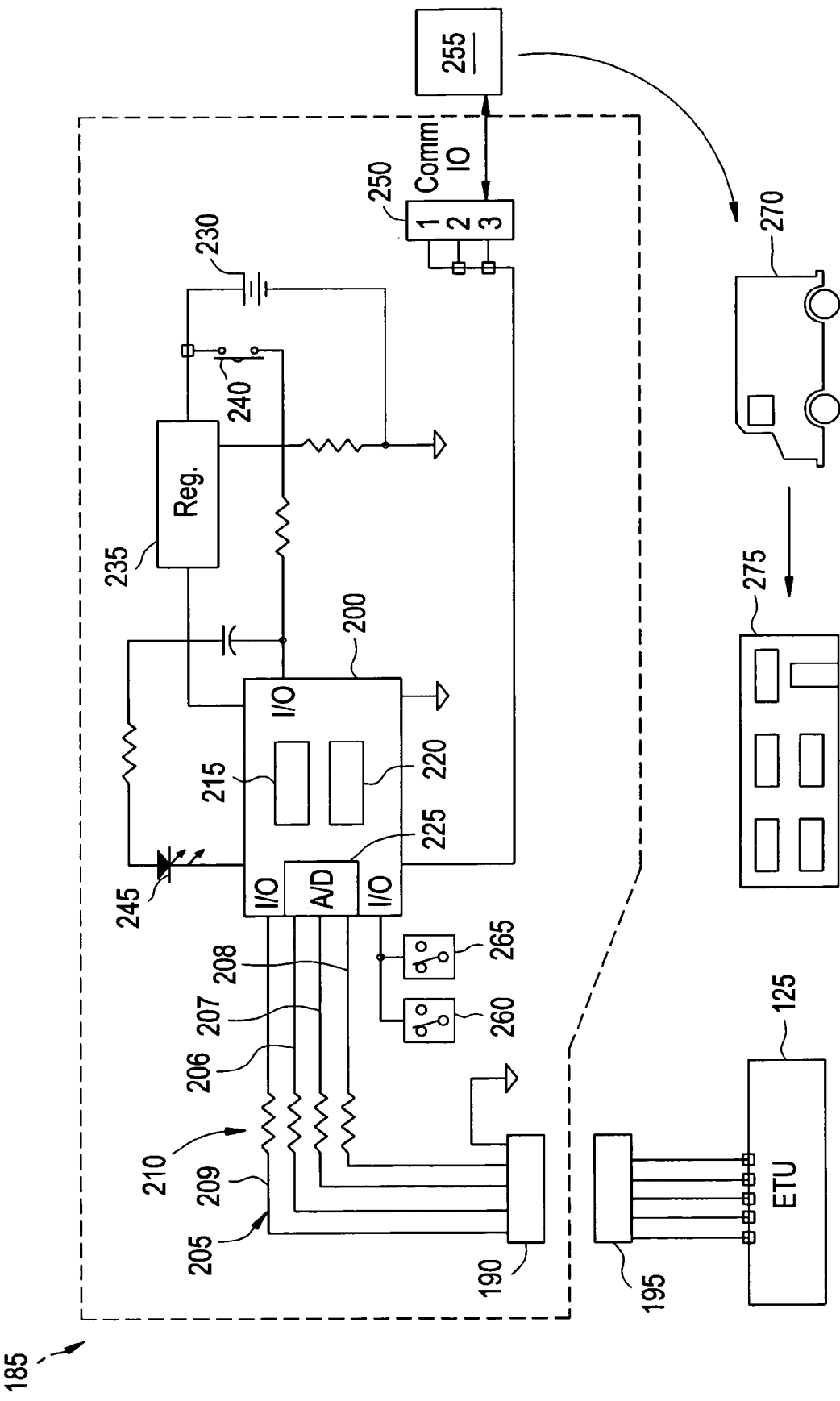
FIG. 2 depicts a schematic of an exemplary waveform recorder device in accordance with an embodiment of the invention.

Referring now to FIG. 2, an exemplary schematic of WRD 185 is depicted having connector 190 suitably disposed for connection with communication port 195 of ETU 125. In an embodiment, WRD 185 has a processing circuit 200 that is in signal communication with connector 190 via signal lines 205. In an embodiment, signal lines 205 include A, B and C-phase current signal lines 206, 207, 208, respectively, that carry information relating to the current level in the A, B and C-phase of circuit breaker 100, and an actuator signal line 209 that carries information relating to a conditional event, such as a trip event (also herein referred to as a trigger event), or a current threshold event (also herein referred to as a current setpoint), at circuit breaker 100. Isolation resistors 210 are employed in signal lines 205 to protect the processing circuit 200 from excessive voltage spikes. While three signal lines 206, 207, 208 are illustrated for a three-pole circuit breaker, it will be appreciated that this is for illustration purposes only, and that the scope of the invention also includes use of the appropriate number of signal lines to accommodate single-pole circuit breakers, two-pole circuit breakers, and four-pole switching neutral circuit breakers.

In an embodiment, processing circuit 200 includes a first memory 215 and a second memory 220. However, in another embodiment, only first memory 215 may be present. In an embodiment, first memory 215 is read access memory (RAM), and second memory 220 is non-volatile memory (NVM), which may be configured as flash memory. Analog-to-digital (A/D) converters 225 at the input to processing circuit 200 converts the analog current signals on signal lines 206, 207, 208 to digital form for processing thereof. In an alternative embodiment, the A/D converters may be located at the ETU 125 or rating plug 155. Accordingly, WRD 185 may be responsive to analog or digital signals arising from the ETU 125 or rating plug 155. The processing circuit 200 is responsive to executable instructions, which when executed by the processing circuit 200, facilitates the sampling of a current signal (also herein referred to as a first signal) on each of current signal lines 106, 207, 208, facilitates the storing in the first memory in a circular queue fashion information relating to the first signal, and facilitates the transferring of data from the first memory to the second memory in response to a conditional event signal, which may be a trip signal, or a current threshold signal such as a current setpoint (this conditional event signal is also herein referred to as a second signal). In an embodiment having only the first memory 215, the processing circuit 200 may be configured to freeze the first memory 215 in response to the circular queue being full and upon receiving an event signal. As used herein, the term circular queue refers to a repetitive process whereby memory is continually over-written with a set of data. Here, the set of data refers to current signals over a window of time (a cycle), wherein the (ith+1) window of time starts at the end of the (ith) window of time, and so on. In an embodiment, the window of time is 100 milliseconds for each of three or four phases of current; however, other time windows may be applicable and are herein contemplated, such as equal to or greater than 20 milliseconds and equal to or less than 200 milliseconds, for example.

For example, during acquiescent current flow through circuit breaker 100, processing circuit 200 continually samples the current signals on signal lines 206, 207, 208, and stores the sampled data in first memory 215. This sampling and storing occurs for a defined time window, such as 100 milliseconds for example, at the end of which, the process is repeated. In response to a trip signal on actuator signal line 209, this sampling and storing process is stopped, followed by processing circuit 200 transferring the data in first memory 215 to second memory 220. In an embodiment, second memory is configured with a plurality of data storage registers, with each register being configured to store one transfer of data from first memory 215, thereby providing for storage at second memory 220 of a plurality of data transfers, with each data transfer being arranged sequentially.

In an embodiment, processing circuit 200 is responsive to executable instructions that cause the processing circuit 200 to stop the sampling of the first signal immediately following a conditional event, such that only pre-conditional-event data is stored in the first memory 215 and then subsequently transferred from the first memory 215 to the second memory 220. In this manner, only phase current data occurring just prior to the conditional event is available for subsequent analysis.

In another embodiment, processing circuit 200 is responsive to executable instructions that cause the processing circuit 200 to stop the sampling of the first signal subsequent to a time delay following a conditional event, such that pre-conditional-event data and post-conditional-event data is stored in the first memory 215 and subsequently transferred from the first memory 215 to the second memory 220. In this manner, phase current data occurring just prior to and just subsequent to the conditional event is available for subsequent analysis. In an embodiment, the time delay is 20 milliseconds, however, other time delays may be employed and are herein contemplated.

In an embodiment, WRD 185 is configured to be self-rearming. That is, in response to a second signal (conditional event) and subsequent to the transferring of data from the first memory 215 to the second memory 220, processing circuit 200 is programmed to automatically rearm itself so that it continues to sample the first signal on signal lines 206, 207, 208, and to store in first memory 215 in a circular queue fashion information relating to the first signal, thereby preparing itself for another data transfer following another conditional event.

In an embodiment, WRD 200 also includes a battery 230, such as a 3-Volt battery for example, for powering the processing circuit 200, and a regulator 235, such as a 1.8-Volt regulator for example, for regulating the voltage of the battery 230. In an embodiment, the processing circuit is programmed to turn the battery 230 off in response to the second memory 220 being full, or in response to a conditional event where the WRD 185 is configured to be manually rearmed, which will be discussed in more detail below. In another embodiment, the processing circuit 200 is programmed to leave the battery 230 on when the processing circuit 200 is configured to automatically rearm itself, as discussed above.

In an embodiment, and as mentioned above, WRD 185 may be configured to be manually rearmed by using a pushbutton 240. When the processing circuit 200 is powered down, such as when the battery 230 is turned off as discussed above, depressing the pushbutton 240 causes the regulator 235 to be pulsed, which turns the regulator on sufficiently to wake up the processing circuit 200. Once the processing circuit 200 is awake, its internal programming causes the battery 230 to turn on. In this manner, a powered down WRD 185 may be manually rearmed following a conditional event by depressing the pushbutton 240.

To aid a user in knowing what state of operation the WRD 185 is in, an embodiment is provided with a visual indicator 245, such as a LED for example, which is in signal communication with the processing circuit 200. In response to first signal data being sampled and stored (recorded) at first memory 215, processing circuit 200 is configured to operate the visual indicator 245 in a first mode, such as flashing light mode, and in response to a conditional event being received on actuator signal line 209, processing circuit 200 is configured to operate the visual indicator 245 in a second mode, such as light on mode.

An embodiment of WRD 185 includes a data extraction port 250 that is in signal communication with the processing circuit 200, and is configured for extracting data from the second memory 220 for analysis at a location other than the circuit breaker 100. Data extraction port 250 may be a proprietary connection port, a serial port, a universal serial bus port, a radio frequency wireless communication port, an infrared wireless communication port, any other port suitable for the purposes disclosed herein, or any combination thereof. Such a port may be used for extracting data from the second memory 220 to an external device 255, such as a desktop computer, a laptop computer, a personal device assistant, a peripheral memory device, the Internet, a network computer, or any combination thereof. In this manner, waveform data of the phase current at circuit breaker 100 occurring proximate in time to a conditional event (pre-conditional-event data only or pre- and post-conditional-event data) may be analyzed for an indication of what may have caused the conditional event to occur.

In addition to the foregoing description, embodiments of the invention may include other user interfaces, such as a first switch 260 that enables a user to switch between automatic rearming mode and manual rearming mode, and a second switch 265 that enables a user to switch between pre-conditional-event data capture only, or pre- and post-conditional-event data capture, which may be accomplished by dialing in a delay time, discussed above, from zero milliseconds to a defined threshold, such as the aforementioned 20 milliseconds for examples.

In an embodiment, the main components of WRD 185 may reside on a small single circuit board and may include just a single microprocessor and a small number of analog components. One such microprocessor contemplated for processing circuit 200 is MSP430 available from Texas Instruments, Inc.

In view of the foregoing structural description, it will be appreciated that the WRD 185 provides a method for recording and having analyzed waveform data associated with an electronic circuit breaker 100 having an ETU 125, the ETU 125 having a communication port 195 and being capable of providing to the communication port 195 a first signal representative of a phase current passing through the circuit breaker 100, and a second signal representative of a conditional event, such as a trigger for tripping the circuit breaker 100. By connecting the WRD 185 to the communication port 195, a user can facilitate the recording of, in a first memory 215 and in a circular queue fashion, information relating to the first signal, and in response to a second signal received from the ETU 125, the transferring of data from the first memory 215 to the second memory 220 is facilitated.

By connecting a peripheral device 255 to the data extraction port 250 of the WRD 185, a user can facilitate the extraction of data from the second memory 220 to the peripheral device 255. In the event that the peripheral device 255 is a data storage device, the user can facilitate the transporting, via mail or other means 270, of the data storage device to a service center 275 for analysis of the data contained thereon. In the event that the peripheral device 255 is an Internet communication device, the user can facilitate the uploading of the data from the second memory 220 to an Internet service facility for analysis of the data from the second memory 220.

In an embodiment, and by the selection of an appropriately configured WRD 185 or by the operation of first switch 260, a user can facilitate the automatic rearming of WRD 185, wherein in response to a second signal and subsequent to the transferring of data from first memory 215 to second memory 220, the WRD 185 automatically rearms itself in preparation to again sample the first signal and store in first memory 215 in a circular queue fashion information relating to the first signal.

In another embodiment, and by the selection of an appropriately configured WRD 185 or by operation of first switch 260, a user can facilitate the manual rearming of a WRD 185, which has been turned off, by pressing the pushbutton 240 that pulses the regulator 235 that causes the WRD 185 to turn the battery 230 on.

In an embodiment, and by the selection of an appropriately configured WRD 185 or by the operation of second switch 265, a user can facilitate, in response to the second signal, stopping the sampling of the first signal such that only pre-trigger data is stored in the first memory 215, which is subsequently transferred from the first memory 215 to second memory 220 in response to the second signal. Alternatively, a user can facilitate, in response to the second signal, stopping the sampling of the first signal subsequent to a time delay such that pre-trigger data and post-trigger data is stored in first memory 215, which is subsequently transferred from first memory 215 to second memory 220 in response to the second signal.

Viewed in an alternative way, the WRD 185 provides a method for recording and having analyzed waveform data associated with an electronic circuit breaker 100, by enabling a user to facilitate the recording at the WRD 185 a set of data relating to a phase current at the circuit breaker 185, each recording of the set of data being temporally proximate a trip event at the circuit breaker 100, and by enabling a user to facilitate the extraction of the set of data from the WRD 185 to a data storage device 255 for analysis at a remote location.

In an alternative embodiment, it is contemplated that the WRD 185 could be offered to an end user with application software, proprietary or open, thereby enabling the end user to upload the stored data to a local computer for local analysis. Graphical display features and analytical functions are contemplated as being part of the application software. The data could also be formatted in a portable document format for use on devices with Internet browser software.

While certain combinations of components of WRD 185 have been described herein, it will be appreciated that these certain combinations are for illustration purposes only and that any combination of any of the components of WRD 185 may be employed in accordance with an embodiment of the invention. Any and all such combinations are contemplated herein and are considered within the scope of the invention disclosed.

An embodiment of the invention may be embodied in the form of computer-implemented processes and apparatuses for practicing those processes. The present invention may also be embodied in the form of a computer program product having computer program code containing instructions embodied in tangible media, such as floppy diskettes, CD-ROMs, hard drives, USB (universal serial bus) drives, non-volatile memory, or any other computer readable storage medium, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to facilitate the recording at a waveform recorder device a set of data relating to a phase current at the circuit breaker, each recording of the set of data being temporally proximate a trip event at the circuit breaker, the recording being useful for subsequent analysis of transient events.

As disclosed, some embodiments of the invention may include some of the following advantages: a powerful diagnostic tool for electronic circuit breakers; a low cost diagnostic tool for electronic circuit breakers; the ability to switch between different operational modes depending on the application demands; the ability to record and later analyze transient current conditions proximate a trip event; the ability to capture line current data without having to rent line recording instrumentation; utilization of existing circuit breaker CTs and dynamic voltages on existing CT burden resistors offer a low cost solution absent a need for additional dedicated CTs; the ability to extract recorded data to a memory device for mailing to a service center for analysis, or to extract and upload recorded data to an Internet service for analysis, thereby providing for a very low cost waveform recorder device having very limited user interface functions; the ability to record real time currents with A/D converters; the ability to record the phase current data using a higher binary and interval resolution than the ETU; the ability to extract trigger criteria from the recorded data; the ability to capture both pre-trigger and post-trigger data; the ability to install in low cost applications due to the low cost of the waveform recorder device itself, thereby enabling the diagnosis of unusual electrical events; the ability to apply embodiments of the invention on an installed base of circuit breakers since the communication port used by the waveform recorder device is an existing test kit jack already available in an installed base of electronic circuit breakers; an easy to install waveform recorder device that simply plugs into an existing test kit jack; and, providing for a simplified interface to the electrical distribution network for monitoring, capturing and preserving phase current data.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for recording and having analyzed waveform data associated with an electronic circuit breaker, the method comprising:
  facilitating the recording at a waveform recorder device in a circular queue fashion a set of data relating to a phase current at the circuit breaker, each recording of the set of data being temporally proximate a trip event at the circuit breaker, the waveform recorder device having been connected to the circuit breaker during the trip event; and
  facilitating the extraction of the set of data from the waveform recorder device to a data storage device for analysis at a location other than the waveform recorder device.

2. The method of claim 1, further comprising:
  facilitating the communication of the data stored on the data storage device to a service center for analysis of the stored data.

3. The method of claim 2, wherein the facilitating the communication comprises:
  facilitating transporting the data storage device to the service center.

4. The method of claim 1, wherein the facilitating the extraction comprises:
  connecting a data storage device to the waveform recorder device and facilitating the extraction of the data therefrom.

5. The method of claim 1, wherein:
  the trip event at the circuit breaker stops the respective recording.

6. A method for recording and having analyzed waveform data associated with an electronic circuit breaker having an electronic trip unit, the electronic trip unit having a communication port and being capable of providing to the communication port a first signal representative of a phase current passing through the circuit breaker, and a second signal representative of a conditional event at the circuit breaker, the method comprising:
  facilitating the connection of a waveform recorder device to the communication port of the electronic trip unit;
  facilitating recording in a first memory of the waveform recorder device in a circular queue fashion information relating to the first signal received from the electronic trip unit; and
  in response to the second signal received from the electronic trip unit, facilitating the stopping of the recording in the first memory.

7. The method of claim 6, further comprising:
  freezing the first memory in response to the circular queue being full.

8. The method of claim 6, further comprising:
  in response to the second signal received from the electronic trip unit, facilitating transferring data from the first memory to a second memory of the device.

9. The method of claim 8, wherein:
  the first signal comprises information relating to a phase current of the circuit breaker; and
  the second signal comprises a trip signal at the circuit breaker.

10. The method of claim 8, wherein the waveform recorder device comprises a data extraction port, the method further comprising:
  connecting a peripheral device to the data extraction port of the waveform recorder device; and
  facilitating extracting data from the second memory to the peripheral device.

11. The method of claim 10, wherein the peripheral device is a data storage device, the method further comprising:
  facilitating transporting the data storage device to a service center for analysis of the data contained thereon.

12. The method of claim 10, wherein the peripheral device is an Internet communication device, the method further comprising:

facilitating uploading the data from the second memory to an Internet service facility for analysis of the data from the second memory.

13. The method of claim 8, further comprising:

facilitating, in response to the second signal, stopping the sampling of the first signal such that only pre-conditional-event data is stored in the first memory, which is subsequently transferred from the first memory to the second memory in response to the second signal.

14. The method of claim 8, further comprising:

facilitating, in response to the second signal, stopping the sampling of the first signal subsequent to a time delay such that pre-conditional-event data and post-conditional-event data is stored in the first memory, which is subsequently transferred from the first memory to the second memory in response to the second signal.

15. The method of claim 8, further comprising:

facilitating automatic rearm of the waveform recorder device, wherein in response to the second signal and subsequent to the transferring of data from the first memory to the second memory, the waveform recorder device automatically rearms itself in preparation to again sample the first signal and store in the first memory in a circular queue fashion information relating to the first signal.

16. The method of claim 8, wherein the waveform recorder device comprises a battery and a battery voltage regulator, wherein in response to the second signal and subsequent to the transferring of data from the first memory to the second memory, the waveform recorder device turns the battery off, the method further comprising:

manually rearming the waveform recorder device by pressing a pushbutton that pulses the regulator that causes the waveform recorder device to turn the battery on.

17. A method for recording and having analyzed waveform data associated with an electronic circuit breaker, the method comprising:

facilitating the recording at a waveform recorder device a set of data relating to a phase current at the circuit breaker, each recording of the set of data being temporally proximate a trip event at the circuit breaker, the waveform recorder device having been connected to the circuit breaker during the trip event; and facilitating the extraction of the set of data from the waveform recorder device to a data storage device for analysis at a location other than the waveform recorder device;

wherein the facilitating the extraction comprises facilitating uploading the data to an Internet service facility for analysis of the data.

* * * * *